Figure 1:
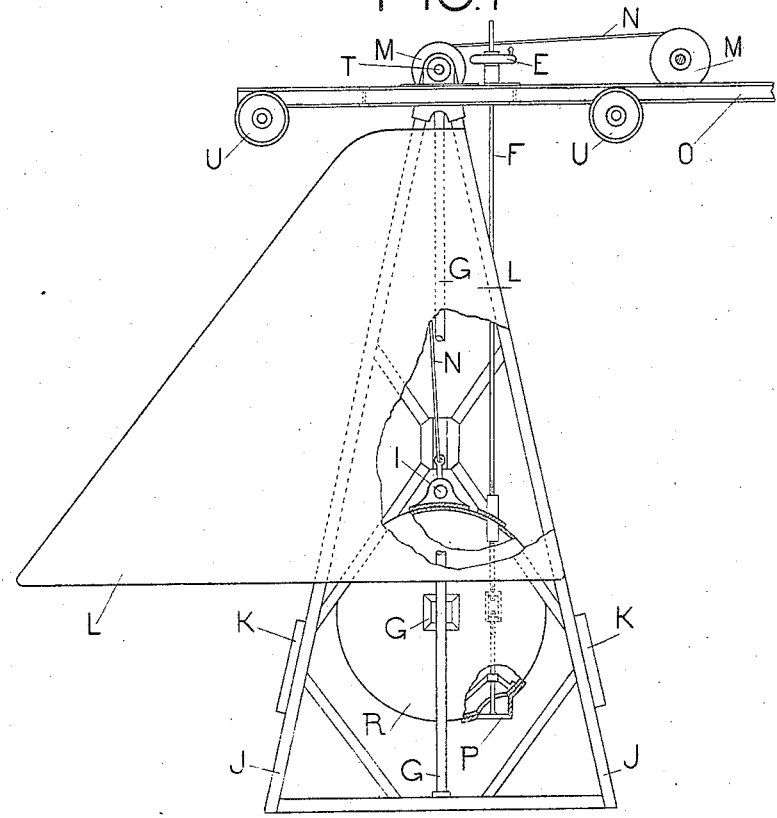

No. 852,661. PATENTED MAY 7, 1907.
J. FORTUNY Y BANÚS.
APPARATUS FOR UTILIZING THE MOTION OF SEA WATER FOR MOTIVE POWER PURPOSES.
APPLICATION FILED AUG. 10, 1906.

2 SHEETS—SHEET 1.

WITNESSES
W. P. Burke
J. H. Saunders

INVENTOR
José Fortuny y Banús
By Richard R. ATTYS

No. 852,661. PATENTED MAY 7, 1907.
J. FORTUNY Y BANÚS.
APPARATUS FOR UTILIZING THE MOTION OF SEA WATER FOR MOTIVE POWER PURPOSES.
APPLICATION FILED AUG. 10, 1906.

2 SHEETS—SHEET 2.

WITNESSES
W. P. Burke
J. H. Saunders

INVENTOR
José Fortuny y Banús
By Richards
ATTYS.

UNITED STATES PATENT OFFICE.

JOSÉ FORTUNY Y BANÚS, OF BARCELONA, SPAIN.

APPARATUS FOR UTILIZING THE MOTION OF SEA-WATER FOR MOTIVE-POWER PURPOSES.

No. 852,661.     Specification of Letters Patent.     Patented May 7, 1907.

Application filed August 10, 1906. Serial No. 330,011.

*To all whom it may concern:*

Be it known that I, JOSÉ FORTUNY Y BANÚS, a subject of Spain, residing at Barcelona, Spain, have invented new and useful Improvements in Apparatus for Utilizing the Motion of Sea-Water for Motive-Power Purposes, of which the following is a specification.

The object of the present invention is the utilization of the different movements of sea water for transforming them into useful motive power.

The essence of this invention consists in the manner of transmitting the action of the motor agent, in this instance the sea, to the apparatus which is to utilize its force, and this is effected by means of blades or vanes submerged in the water and which form part of a structure adapted to oscillate about a horizontal axle situated at its upper extremity and which at the same time is its axle of suspension, so that the sea currents in their advance and recession communicate their movements to the blades or vanes and thus to the structure supporting them. In this way the combination of the blades or vanes and the structure will constitute a pendulum in as much as it will be submitted to the to and fro or oscillatory movements about its axis communicated to it by the waters. In addition each pendulum serves as an envelop or guide to buoys or floats to which it communicates the oscillatory movement and to which is added the ascensional and descensional movement which is peculiar to floating bodies submitted to the variable motion of waves.

By means of the combination of the pendulums with the buoys forming the pendulum buoy the principal feature of this invention, all the movements of sea water can be utilized however slight or strong they may be, even in the case of fierce storms since the current which actuates the apparatus is not only at the surface or where the waves break but above all that current which is below the wave which produces a less sudden but continuous movement and more uniform oscillation. The prejudicial effects which would produce in the apparatus the repeated shocks of the waves as much at ordinary times as during stormy weather are prevented by means of a shield or break-water which fixed to the structure forms a front and side cover to the apparatus and on which owing to its form resembling the prow of a ship the blows of the waves are broken and deviated.

If the shield or break-water is not sufficient to resist the violent blows of the waves, as the pendulum buoy is suspended to a small carriage running on two rails it can be transported to a reserve position where the pendulum buoy after being raised to a convenient height need not be influenced by these effects. Finally where the pendulum buoy may acquire a too much accelerated movement the buoy can be filled with water in the manner hereinafter described and thus will produce a powerful braking action. Generally it will not be necessary to have recourse to these means the movement of the blades or vanes being effected almost without blow or shock as soon as they are submerged by a body of water which has only the power to oscillate and thus offers a certain resistance to abrupt changes of motion.

In the small carriage above referred to are disposed the other accessory parts of the apparatus, such as the elevator for the pendulum buoy, the apparatus for raising and lowering the buoy, the pumps, the gearing, the levers, the transmitting gear and any other elements that may be thought necessary.

In order to graduate the load water line of the buoy or to raise it entirely, it is only necessary to open the valve with which it is furnished; the water thus enters the interior so as to arrive at the desired level or equivalently it can rest on the bottom of the structure by its own weight where it will only have the pendular motion. In order to float it the valve is opened and the buoy is raised by means of a cable which is wound round the drum of the carriage until it attains the desired water load line and then the valve is closed.

The power obtained by means of the pendulum buoy can be collected and transmitted from any point of the pendulum either above or below the axis of oscillation, employing if desired the oscillatory movement which the long sides of the pendulum make and varying generally as desired the system adopted in as much as when once obtained the combination is perfect between the movements of advance and recoil ascent and descent and the method of profitably using the power produced by these movements will be an accidental part of the problem to which any arrangement thought fit can be applied.

The drawing herewith illustrates by way of example one of the many ways of carrying out the pendulum float and the method of transmitting the motive force produced.

Figure 2:
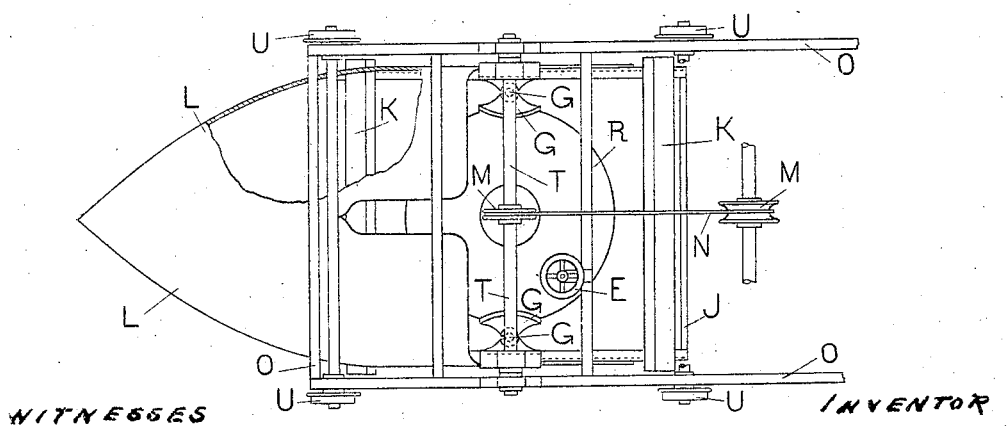
Figure 3:
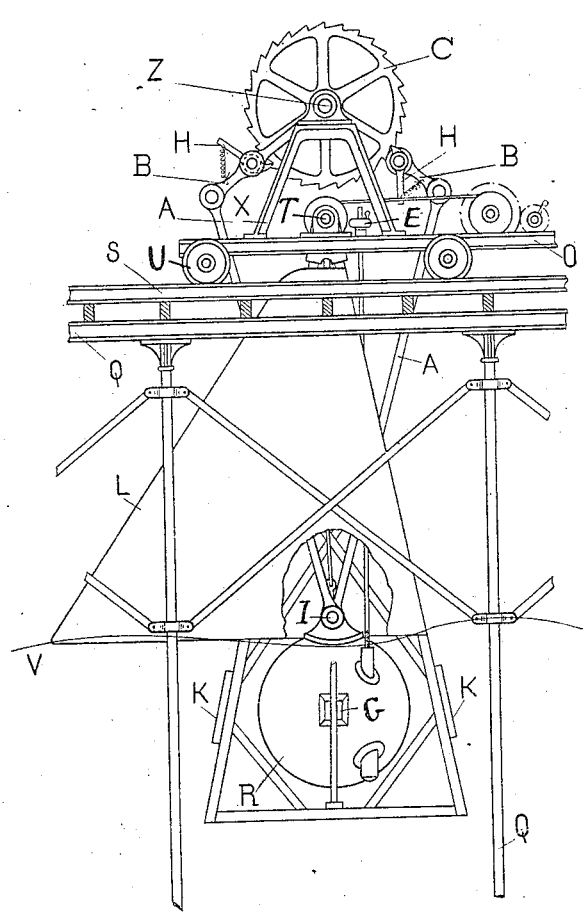
Figure 4:
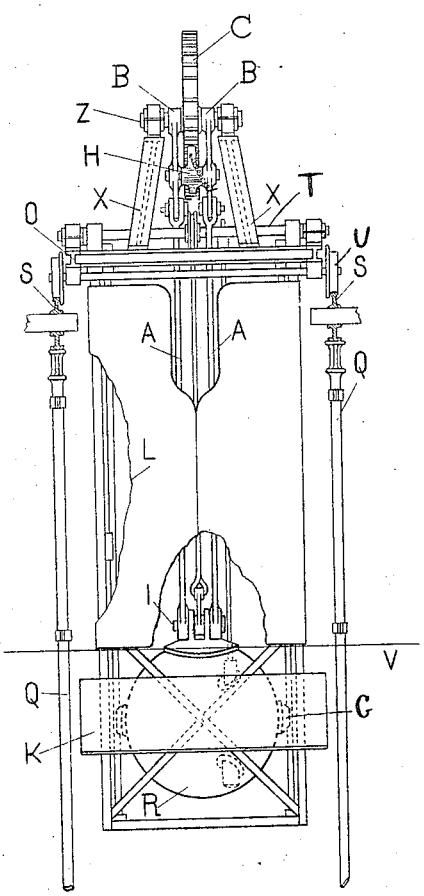

In the drawings:—Figure 1 represents a side elevation of the pendulum buoy. Fig. 2 is a plan of the same pendulum from the upper side partly in section. Fig. 3 indicates on a smaller scale a side elevation of the arrangement of a mechanism for utilizing the motive power of the pendulum buoy. Fig. 4 is a front elevation of the same.

The proper working of the pendulum buoy, Figs. 1 and 2 requires its installation in such a manner that the shield L L receives the action of the waves, so that the blades or vanes K K will be submerged at a lower depth and in a more regular current. The blades or vanes K K which may be variable in number and in form are fixed to a structure J J of any convenient rigid form which is adapted to oscillate about a horizontal axis T of which the bearings are mounted on the longitudinal beams of the small carriage mounted on the wheels U. In the interior of the structure J J, is arranged in a swinging manner a buoy R of any form and dimensions so long as the effect desired is obtained. This buoy is guided vertically in its movement of ascent and descent by a pair of slides G and is furnished with a valve P connected to a rod F so as to open and shut the said valve by turning the wheel E thereby allowing water to enter the interior of the buoy. Finally the buoy is connected to and suspended by a cable N which passes over two grooved pulleys of the barrel M so as to be raised or lowered at will.

From the description of the apparatus its mode of action is easily understood. In effect, while the waves beat against the shield L which disperses them, the current underneath the waves acts on the blades or vanes K, presses upon them and causes them to recede, and carrying in that movement the pendulum and the buoy which will oscillate about the axis of suspension T. On the other hand the buoy exaggerating the movement of recoil will have another ascending movement due to the level of the waters on which it floats being increased or diminished. The water on reflowing toward the sea produces an inverse action on the blades or vanes and the pendulum which carries the buoy with it exaggerates this pendulum movement and will have another movement of ascent or descent following the level of the sea. This movement of the apparatus combines the arrangement of the ascent and descent which is with that of the buoy and which being only applicable to the buoy and which being continually reproduced can be utilized in different ways. One of these is that illustrated in Figs. 3 and 4 where the pendulum float is suspended to a small carriage O movable along the rails S of the structure Q mounted on a convenient place on the shore and of which the form, dimensions and other details are sufficient for giving the necessary strength. At the upper part of the buoy R and rigidly attached thereto is a support having an axis I to which is connected two connecting rods A, at a given angle to each other which are hinged at their opposite ends to two levers B adapted to turn about the horizontal axis Z which constitutes the point of support of these levers the whole forming a hinged quadrilateral figure. On the axle Z and between the levers B is mounted a toothed wheel C, with the teeth of which engage detents H. The line V V represents the dividing line between the waves which act on the shield L and the current which acts on blades or vanes K.

The waters in advancing make the pendulum buoy recoil and carry in its movement the two connecting rods A and these cause the levers B to oscillate about the axis Z and the detents H to turn the wheel C through a certain angle. But the recoil of the pendulum buoy is simultaneous with the ascent of the buoy and consequently this causes the two connecting rods to separate and one of them, that on the right in this particular case, turns the wheel C through a further distance by means of the lever and the detent, which movement is added to that obtained by the movement of the pendulum; the waters on retiring and the pendulum advancing do not exert the action in this particular case on the wheel C but as at the same time the buoy descends, the left connecting rod pushes its lever relative to the wheel C and causes it to turn. By a convenient arrangement the pendulum can be made in advancing to act also on the wheel C and cause it to turn. This movement of rotation obtained about the axis Z can be utilized so that when produced it will be rendered more uniform by means of fly-wheels or by any other convenient arrangement. Such rotation can be also transmitted by means of cog-wheels, gearing, straps or the like and to be utilized direct by means of the lift of the water.

It must be further added that the origin of the present invention being the solution of an extremely complicated problem of which the bases are not easy to choose, the form, structure, dimensions and arrangement of the pendulum buoy can be varied, the system employed for its raising and suspension, the shield or the installation of the various parts, the number of pendulums or buoys employed as well as the manner of graduating the floating of the buoy, the system of valve, the quality and form of the materials employed as well as their number and kind, in general all that which is independent of the perpendicular movement of the apparatus combined with that of the ascent and descent of the buoy.

It goes without saying that when it is desirable that the pendulums be employed alone i. e. without buoys and either in the one or other case can have scoops as may be desired and of any convenient form the pendulum buoy or its blades or vanes can be provided with special mechanism to maintain them always normal to the direction of the currents.

Having now described my invention what I claim and desire to secure by Letters Patent is:—

1. In a device of the class described, the combination of a frame suspended at its upper end so as to have oscillating movement, a float slidably carried by said frame, an apparatus to be driven and levers connected to said float and adapted to transmit to said apparatus both the oscillating movement of the frame and the vertical movement of the float.

2. A wave motor comprising a frame suspended at its upper end so as to have oscillating movement, blades on said frame submerged in the water, means for transmitting the movement of said frame and a shield on the frame for preventing shocks thereto from the waves.

In testimony whereof I have signed my name to this specification in the presence of two subscribing witnesses.

JOSÉ FORTUNY Y BANÚS.

Witnesses:
   BENJ. H. RIDGELY,
   JOSÉ M. ERTAPE.